March 4, 1958

B. SCHECHTER 2,825,893

MOTION TRANSLATION SYSTEM

Filed June 29, 1953

INVENTOR.
BERNARD SCHECHTER,
BY
Paul A. Weilein
ATTORNEY.

March 4, 1958 B. SCHECHTER 2,825,893
MOTION TRANSLATION SYSTEM
Filed June 29, 1953 3 Sheets-Sheet 2
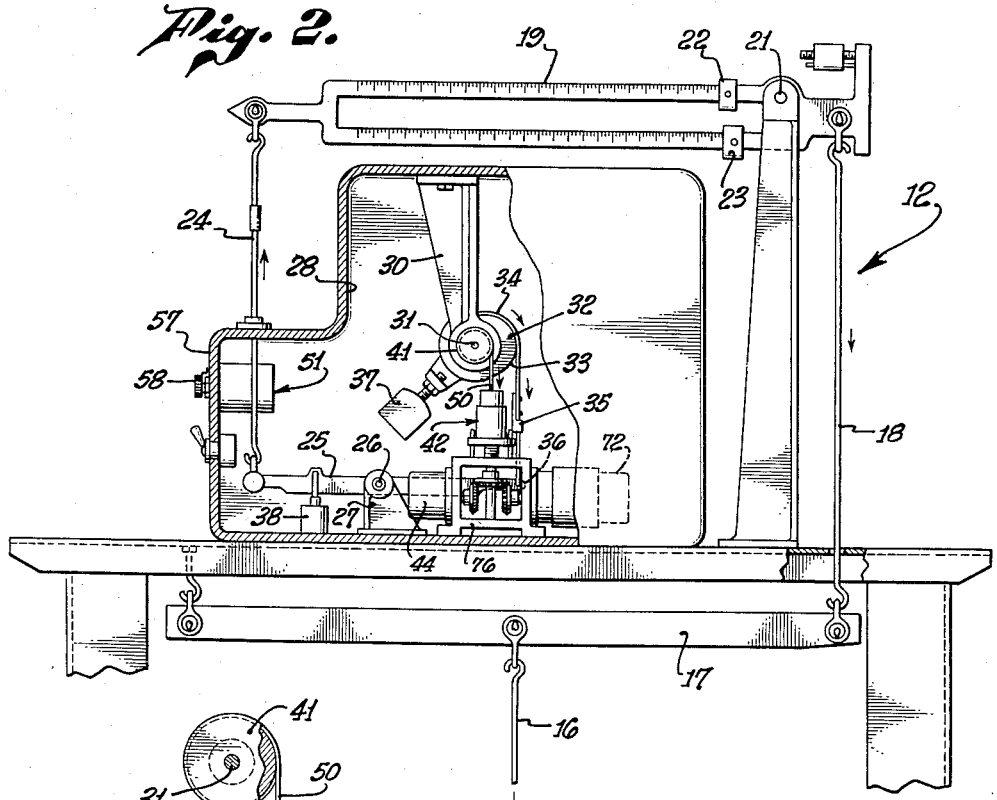
INVENTOR.
BERNARD SCHECHTER,
BY
Paul A. Weilein
ATTORNEY.

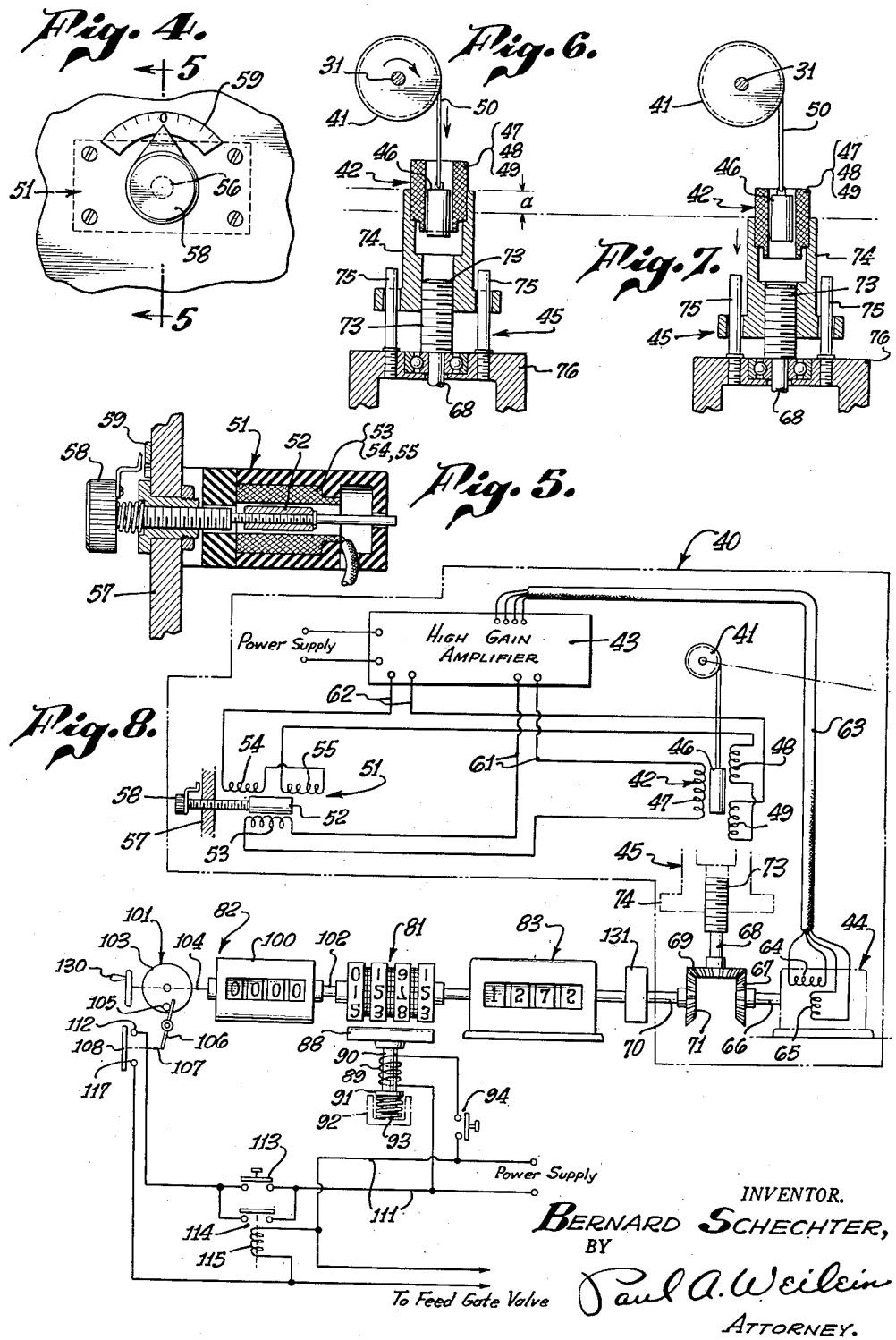

United States Patent Office 2,825,893
Patented Mar. 4, 1958

2,825,893

MOTION TRANSLATION SYSTEM

Bernard Schechter, Montebello, Calif.

Application June 29, 1953, Serial No. 364,906

11 Claims. (Cl. 340—187)

This invention broadly relates to the translation of motion and is particularly concerned with the faithful and accurate reproductions of small motion increments of an input member or motive device by a power device or output member either as equivalent movements or as proportionally increased or decreased movements.

While motion translation of itself has long been a fruitful field for the development, construction and perfection of a wide variety of divergent conceptions and inventions utilizing all types and varieties of energy conveyance including mechanical, fluid, electrical and radiating energies such as heat, light and sound, numerous problems still confront those seeking perfection in the rapid, effective, efficient and meticulously accurate reproduction of a primary motion by a secondary element.

In strictly mechanical trains for motion translation, the physical structures themselves impose limitations inhibiting delicate accuracy. The mass of the moving parts creates inertia reactions militating against reliability, while wear, deterioration and dis-adjustment require frequent repair. Furthermore, such devices are usually of complicated design, delicate construction and subject to the influence of ambient temperature, pressure and humidity conditions. One more important limitation of such mechanical devices is the difficulty of achieving power in the responsive movement such as to operate associated mechanisms under their control.

Fluid systems for the present purpose are frequently sluggish, since pressure changes follow the characteristics of wave formations and are subject to the frictional dampening inherent therein. Fluctuating temperatures are particularly effective in altering the responsiveness of such devices and such systems involve intricate piping and valving arrangements which are both expensive and vulnerable. While certain of such instrumentalities provide power inputs between the sensed motion and the responding element to provide motive capabilities, such means usually involves pumping equipment, the control of which imposes time lags. Valving arrangements provided with constantly driven pumps introduce surging and consequent disturbances.

Both purely mechanical and fluid pressure or flow methods and means for motion translation have been successfully used with commercially acceptable efficiency and fidelity in many fields over a long period of years. Systems involving the use of heat, light and sound have been primarily associated with highly technical scientific instrumentation. The minute accuracy of such means is beyond question, but such accuracy is for the most part predicated upon a sensitivity wholly incompatible with the demands of commercial installations which must withstand the shocks, stresses and strains of an industrial environment.

In view of the foregoing, electrical systems have become more and more favored as a means for relaying, multiplying or dividing motions. Such systems are usually of reasonable accuracy, involve few and simple mechanical components, are relatively free from distorted response due to temperature, pressure or humidity fluctuations and they may involve only simple, compact and inexpensive apparatus.

One typical example of a widely used and generally accepted electrical means for motion translation is the Selsyn motor system wherein the movements of the armature of a sending or master motor are faithfully reproduced in the responsive movements of the armature of one or more receiving or slave motors. While such systems are generally accepted where the problem involves one of remote location of the power device or output member, such systems do not of themselves provide for proportional amplification of the input motion. Such systems also frequently need in combination therewith, for many commercial purposes, resetting or zeroing means not only to return the armatures to a uniform primary position but to adjust the system to changes either purposeful or accidental in the primary location of the input member or motive device.

It is therefore among the primary objects of the present invention to provide a motion translating system which is not only amenable for use for the responsive control of a remotely located power device or output member, but which provides for a proportional amplification or diminution of motion of such power device or output member from that of the input member or motive device.

Another primary object of the invention is to provide a method of and means for motion translation by which a zeroing of the system may be conveniently carried out in order to return the mechanical constituents to a desired original relationship so that future responsive movements of a power device or output member may reflect motions from a variable adjusted base position of an input or motive device.

A further important primary objective of the present invention is to provide a novel, effective, efficient and faithfully responsive method of and means for translating motion which, while providing for proportional amplification or diminution of the response movement and for the zeroing of the power device or output member with respect to variable locations of the input member or motive device, is nevertheless simple in both construction and operation, requires few parts, utilizes sturdy instrumentalities which are neither easily dis-adjusted or easily worn to the point of introducing inaccuracies and which is well adapted to the demands of economic manufacture, upkeep and use.

While these primary objectives are broadly set forth without reference to specific types of utilization of the invention and while the primary inventive concepts thereof as herein set forth are broadly applicable to a wide variety of alternate method steps and structural embodiments, the invention is particularly applicable as a method of and means for electrically translating motions. As a specific application of the invention in the solution of a particular industrial problem, the drawings and following specification set forth the device as related to a weighing mechanism. This present illustrative embodiment of the invention relates to apportioning systems, and more particularly to automatic fluent matter systems for measuring or metering a predetermined amount of matter or material flow from one point to another. With such mechanisms, it has been found difficult to provide highly accurate digital recording or printing of the operations of the scale. As thus applied, the invention includes additional and more specific objectives.

Thus, it is an important object of the specific embodiment of the invention here illustrated, to provide an apportioning system which measures the flow of a material from a feeder or storage point to a receiver point, in which system the flow is cut off when an exact predetermined amount of material has been metered to a control point. It is a further object of this embodiment of the invention to provide resettable means for normally predetermining the flow of material between start of flow and cutoff. Therewith it is also an object to provide means to obtain recorded evidence of the final amount of material at the time of cutoff.

Another object of the invention as here applied to weighing means is to provide an apportioning system wherein the flow of material is sensed by suitable measuring means having an output fed into a servomechanism device whose output is utilized to actuate indicating, recording, and switching devices. A companion objective is to provide such a system wherein the switching device coupled to the servo output may be utilized to cutoff flow of the material in response to a predetermined setting of an indicating or recording device also coupled to the servo output.

Another object is to provide in a servomechanism as aforesaid, a null-balance by means of a follow-up coupled to the servo output whereby the servo is made extremely sensitive to minute changes in material flow as sensed by the measuring means. A further object is to provide means for correction calibration of the servomechanism whereby ambient factors may be suitably accounted for in order to maintain the inherent sensitivity of the system. It is a feature of the device to be described that the servomechanism is extremely sensitive to small changes of weight of material at the receiving point, due to the nature of the null-balancing device incorporated into the servo.

Other and further objects and features will be apparent from the following description when considered with the accompanying drawings which show a preferred embodiment of the invention and are not to be construed as a limitation since, as hereinbefore pointed out, it will be apparent to those skilled in the art that the primary concepts of the invention may be incorporated into other systems without departing from the spirit thereof.

Referring to the drawings:

Fig. 1 is a schematic view of an apportioning system, embodying the present inventive concept and fulfilling both the primary and specific objectives hereinbefore outlined;

Fig. 2 is a detailed elevational view, partly in section, of a portion of the weighing scale diagrammatically illustrated in Fig. 1;

Fig. 3 is an enlarged detailed view, partly in section, of a portion of the mechanism shown in Fig. 2;

Fig. 4 is a front view of the calibration knob and indicia scale associated with the servo mechanism;

Fig. 5 is a sectional view of the calibrating device, taken on the line 5—5 of Fig. 4;

Figs. 6 and 7 are sectional views of the upper portion of the mechanism shown in Fig. 3, in two operative positions; and Fig. 8 is an alternate embodiment of a portion of the system shown in Fig. 1, and further showing means for continuously displaying the weight of material in the weigh hopper.

Referring to Fig. 1, diagrammatically disclosing one industrial application of the invention, there is shown an apportioning system having a feed hopper 10 adapted to feed material into a weight hopper 11 which is coupled to a beam scale device, generally designated by the numeral 12, through a lever linkage comprising the splice arms 13, a link 14, a lever 15, another link 16, another lever 17, and a beam link 18 to the scale beam 19 of the scale 12. Referring more particularly to Fig. 2, the beam 19 is adapted for rotative movement about the pintle 21, and may be provided with slidable poises or weights 22 and 23 for adjusting the range of the apportioning system.

The left end of the beam 19 is connected by means of a shelf lever link 24 to the shelf lever 25 mounted for rotation on a pintle 26 secured in a bearing member 27 to the scale frame 28. A shaft bracket 30 is secured on the frame 28 and the main scale shaft 31 rotatably mounted therein. A pulley-like member 32 having its peripheral face 33 formed in the shape of a cam is mounted on the shaft 31. A flexible metal ribbon 34 is fastened at one end to the face 33 and passes thereover, being connected at its other end with a link member 35 which is pivotally joined with the right end 36 of the shelf lever 25. A counterbalance weight 37 is adjustably secured to and for rotation with the shaft 31. A dashpot 38 may be employed to damp out the oscillations of the weighing system.

The foregoing description portrays and explains a weighing scale mechanism which is well known, and it is now apparent that when an added weight is taken by the link 14, as for example when material flows from the feed hopper 10 into the weigh hopper 11, the force of the added weight is transmitted to the main shaft 31, causing it to rotate in a clockwise direction as viewed in Figs. 1 and 7, whereupon the counterbalance weight 37 is caused to move outwardly and exert a larger counterbalancing force moment on the shaft to bring the system into equilibrium. It is a feature of the system that the angular rotation is directly proportional to the weight added, and this is accomplished by the cam face 33 of the pulley-like member 32, as will be apparent to those skilled in the art.

The end use of such a system is, of course, to convert the main shaft rotation into a useful function, such as for example to indicate weight of material in the hopper. This may be accomplished by attaching a movable scale to the shaft and reading off the weight indicated opposite a fixed pointer. One of the drawbacks of the prior art has been the difficulty of devising such indicators having a precision permitting the reading of small variations in weight where the weighed material mass may run into hundreds or even thousands of pounds. The reason for this is that the main shaft rotates an almost microscopic amount for small changes of weight, and may rotate only about 50–60 degrees in angular movement over the full weight scale.

The present invention overcomes many of the problems of the prior art by taking the shaft movement and amplifying it with great precision without the use of gear trains or other cumbersome and inaccurate mechanical transmission means. The output of the amplifier is then available in the form of a reading or reporting indicator.

As a preferred embodiment, and referring more particularly to Fig. 1, the output of the main scale shaft 31 is fed into a servomechanism 40 from a pulley 41 secured on the shaft 31. The servo 40 includes a null balancing transmitter or signal generating device 42 embodying means for generating a signal upon variation of its input, a high gain amplifier 43 for converting the signal into an electrically useful quantity, a repeater 44 shown herein as a two-phase balancing motor, and a follow-up device 45 for sampling the repeater output and feeding it back into the transmitter 42. The function of the amplifier is to recognize a minute off-balance voltage generated at the transmitter or signal generating device 42 and to discriminate its phase relationship and greatly amplifying this condition, so that the balancing motor can be driven in a direction to cause the transmitter to reestablish a null-balance condition.

The transmitter or signal generating device 42, as here shown, includes two relatively movable members, one of which is a magnetically excitable armature or slug 46 adapted for movement within the magnetic fields of a primary exciting winding 47 and secondary windings 48 and 49. The windings 47, 48 and 49 and their enclosure housing constitute the other movable member which is movable relative to the armture or slug 46 to achieve a null balance as will be hereinafter fully described. One end of the slug 46 is attached to the pulley 41 by means of a thread or wire 50 which passes over the pulley. It is preferred that the wire 50 have a zero coefficient of temperature expansion to obviate errors which might arise out of temperature variation at the scale location.

Means are provided for "zeroing in" the servo 40 and thereby correcting for temperature and other variations not otherwise accounted for. Any suitable null-balancing transmitter or signal generating device having phase discrimination according to manipulation of a variable element thereof may be employed for this "zeroing in" of the servo 40. Thus, a potentiometer or other device serving the purpose thereof may be employed. However, in the present instance a differential transformer device 51 is used for this "zeroing in" operation. Accordingly, for convenience, the terms "transformer device," "differential transformer" and "transformer" are used to define the "zeroing in" means and these terms are intended to include the above noted or any other electrical devices having similar "zeroing in" propensities suitable for the system of this invention.

Referring now to Figs. 1, 3, 4 and 7, it will be seen that the differential transformer device 51 includes a magnetically excitable slug 52 adapted for movement within the magnetic fields of a primary winding 53 and secondary windings 54 and 55. One end of the slug 52 is attached to a non-magnetic rod 56 which is threadedly received in the front panel 57 of the frame 28. A knob and pointer 58 is secured on the outer end of rod 56 with an indicia scale 59 secured on the panel 57 adjacent the pointer, as more clearly shown in Figs. 3 and 4.

The primary windings 47 and 53 of the signal generator or transmitter 42 and differential transformer 51 respectively, are connected in series and excited with alternating current procured from the amplifier 43 as supplied thereto by a pair of power mains 60. Conductors 61 serve to connect the amplifier to the primaries. Secondary windings 48 and 49 of the transmitter or signal generating device 42 are connected in series-bucking relationship through the secondary windings 54 and 55 of the differential transformer device 51, also in series-bucking, to the amplifier through the input conductors 62.

The amplifier 43 is connected by means of a cable 63 to the repeater motor 44 whose energizing fields 64 and 65 are energizable by the power mains 60 and the input conductors 62 through the agency of the amplifier 43. A shaft 66 having a gear 67 affixed thereto is adapted to reversibly rotate the follow-up input shaft 68 by means of the gear 69 secured thereon and meshed with gear 67. A shaft 70 constitutes the power output means for the motor 44 through the meshing of a gear 71, secured to the shaft 70, with the gear 69. A synchro-generator or selsyn master motor 72, of the type well known in the art, is shown as being secured on the output shaft 70.

Referring to Fig. 3, the follow-up device 45 is shown in detail. It will be seen that the follow-up input shaft 68 has one end 73 threadedly received in a non-magnetic housing 74. The upper end of the housing 74 is hollowed out so as to have secured therein the assembly comprising the windings 47, 48 and 49 of the null-balancing transmitter 42. The housing 74 is prevented from turning by a pair of pins 75 screwed into the frame 76 which supports the motor 44, device 45, and generator 72 in the scale frame 28. The housing 74 is free to move up and down on the pins 75 in accordance with rotation of the input shaft 68.

The threaded connection between the end 73 of the shaft 68 and the housing 74 determines the relation of final output motion to input motion. Thus, such responsive motions may proportionally increase or diminish the input motion as determined by the pitch of the threaded connection. As here shown, the thread pitch is fine and the output motion is amplified, since it will require many turns of the shaft 68 to move the housing 74 up or down for re-establishment of the original relation thereof with the core or slug 46. Conversely, should the mechanical connection between shaft 68 and housing 74 be such as to move the housing further than the slug moves during any specific angular displacement of shaft 31, the responsive motion will be diminished. In any event, however, the movement will be accurately proportional.

Referring to Fig. 1 again, the power output from the output shaft 70 may be utilized to actuate a variety of indicating, recording, and/or energizing devices. In the preferred embodiment shown, the output power operates a Selsyn master motor 72, whose electrical power energizes a Selsyn slave motor 80, which, in turn, is shown as driving a recording device 81, and a presetting device 82 which will be described hereinafter. In Fig. 8 the output power shaft 70 is shown as driving directly an indicating device 83 in addition to the recording device 81 and the presetting device 82. The synchro system of Fig. 1 has its energizing windings supplied with power from the power supply conductors 85, the three-phase stator windings of the system being joined by conductors 86 in the usual manner. The recording device 81 comprises printing wheels as shown, having ten digits from zero to nine on each wheel. Transfer pinions and transfer teeth, not shown, are utilized in the known manner of digital counting devices to transfer tens in accordance with the rotation of the input thereto by a shaft 87 forming the output means of the motor 80 through a clutch 131.

Means for obtaining a printed record comprises a printing platen 88 adapted to receive a paper or card on its upper surface. A solenoid winding 89 is shown as disposed about the solenoid core 90 which carries the platen 88 on its upper end and has a collar 91 affixed adjacent its lower end. A magnetizable housing 92 is spaced from the lower end of the core 90 and encloses a compression spring 93 disposed about said core. The winding 89 is connected through the push button switch 94 to the power supply conductors 85.

The printing wheels of the recording device 81 may have a suitable inking means (not shown), preferably an inking roller, disposed adjacent thereto for supplying ink to the surfaces of the numerals on the printing wheels. It is now seen that a paper or card may be placed on the upper surface of the platen 88. The switch 94 may then be closed, energizing the winding 89 and drawing the core 90 toward the housing 92 against the compression of spring 93. Upon opening the switch 94 the de-energized winding 89 allows the spring 93 to accelerate the platen 88 upwardly until the paper or card is imprinted by the numerals opposite thereto, thereby providing a permanent record.

The presetting device 82 comprises an indicating means 100 and a switch tripping mechanism 101. The means 100 may comprise a well known digital counting device in which the mechanism 101 is embodied but is here shown schematically in relation thereto. The wheels of the counting device 100 are numbered zero to 9 on the outer peripheries thereof, being coupled together for operation by transfer pinions and transfer teeth (not shown) in a similar manner to that of the recording device 81. The counter 100 has an input through a transmission 102 from the output shaft 87 of the motor 80, shown here as coupled through the recording device 81.

The tripping mechanism 101 includes the wheel at the extreme left end of the counter 100 and is here shown schematically at 103 as having a connection indicated at 104 with the means 100. A pin 105 on the wheel 103 is adapted to engage a pivoted lever 106 which has a link 107 arranged to actuate the switch 108 to an open position when the wheels of the indicating means 100 are moved to the zero register position, as shown. The wheels of the counter 100 are preset by holding the shaft 102 against turning while turning each wheel to indicate any value desired. A holding wheel 130, shown schematically in Figs. 1 and 8, may be provided for holding the shaft against turning.

The switch 108 is adapted to provide power from the power supply conductors 85 to a solenoid valve 110, associated with the feed hopper 10, from a pair of conductors 111, one of which has a connection to a contact 112 of the switch 108 through the switch 113 and the holding relay 114. The other of the pair of conductors 111 has a connection to one side of the coil 115 and to one side of the coil 116 of the solenoid valve 110. The other sides of both coils 115 and 116 are connected to a contact 117 of the switch 108.

The fluid valve 124 of the solenoid valve 110 is of the four-way type adapted to supply fluid under pressure from a source 120 to either end of a cylinder 121 having a piston therewithin to operate a feed gate 122 of the hopper 10. A waste pipe 123 allows waste fluid to be dumped through the valve 124 from either end of the cylinder 121.

*Operation*

In the operation of the system it will be assumed for purposes of explanation only that it is desired to apportion 1272 pounds of material from the feed hopper 10 into the weigh hopper 11. The operator proceeds to preset the device 82 in the manner hereinbefore noted to read 1272. As the register of the indicator 100 increases from the zero showing, the trip mechanism 101 allows the switch 108 to close the circuit across the contacts 112 and 117. Assuming that the operator has already "zeroed-in" the servo 40 by adjustment of the knob 58 of the transformer device 51, he is then ready to weigh out material. The clutch 131 is only used for the initial "zeroing" of the printing and indicating wheels with the gear 71 and the true zero of the scale.

Closure of the switch 113 energizes the holding relay coil 115 and the solenoid winding 116, the latter actuating the valve 124 to allow fluid pressure to open the gate 122. The weight of the material flowing into the hopper 11 is transmitted through the arm, link and lever system to the shelf lever 25 to cause it to move clockwise and transmit a clockwise movement to the pulley 41 which causes the slug 46 to move downwardly in the transmitter or signal generating device 42. Movement of the slug causes an unbalanced current to be generated in the secondary windings 48 and 49 which is fed through the conductors 62 into the amplifier 43.

The amplifier 43 now senses the phase of the current unbalance and causes a current of the proper phase relationship to flow through the windings 64 and 65 of the motor 44, whereupon the shaft 66 turns the gears 67, 69 and 71. Rotation of gear 69 causes the follow-up input shaft 68 to rotate, whereby the housing 74 is moved downwardly by the threaded end 73 of the shaft 68. Downward movement of the housing and the enclosed windings 47, 48 and 49 of the transmitter 42 thus follows the downward movement of the slug, whereby the transmitter 42 tends to bring itself into null-balance with movement of the slug 46.

The aforesaid action is instantaneous and continuous so long as material continues to flow into the weigh hopper 11. Should the flow of material stop for any reason the transmitter will be brought into null-balance and motor 44 will cease to turn.

It will be observed that rotation of motor 44 is also transmitted through the gears and the Selsyn motors 72 and 80 to the printer 81, the counter 100, and the trip mechanism 101, all of which will faithfully follow the weight of the material flowing into the weigh hopper 11. If the flow stops for any reason, the amount in the hopper is shown on the counter 83, and a record may be made on a card in the printer 81. The counter 100 on the contrary indicates the difference of the expected weight and the amount in the hopper, thereby making it possible to determine the amount necessary to complete a given weighing operation.

Assuming the material to continue flowing, when the weight thereof in hopper 11 reaches 1272 pounds, the printer wheels will present that figure to the platen 88 and the counter 100 will register zero. At the same instant the trip mechanism 101 will trip the switch 108 thereby opening the circuit to the relay coil 115 and to the solenoid coil 116, whereupon the valve 124 will be actuated so as to vent the pressure to the left end of cylinder 121 and supply fluid pressure to the right end thereof to close the gate 122 and stop material flow into hopper 11.

The hopper 11 may now be emptied into a surge hopper or other disposal medium (not shown) by opening the discharge gate 132.

Upon discharge, the hopper 11 will rise until the beam scale 12 is again in equilibrium, the pulley 41 thereupon being caused to rotate counterclockwise and lift the slug 46 back to its original position. The extreme movement of the slug causes a large unbalance current to be generated in the windings 48 and 49 of the opposite phase. The amplifier 43 senses this reversed phase and the magnitude of unbalance and feeds a strong voltage to the motor 44 which, in turn, repositions the windings 48 and 49 through the follow-up mechanism, and also repositions the printer 81 to zero and the counter 100 to register 1272. The trip mechanism 101 allows the switch 108 to close, whereupon the apportioning cycle may be repeated by closing switch 113.

The range of movement of the slug 46 and the correlative range of movement of the housing 74 is dependent, of course, on the scale limits and is coordinated therewith. The amount of slug and housing movement for any one weighing and apportioning operation is then linearly proportional to that weight. The slug and housing may, for example, have a total range of one-half inch movement.

Referring to Figs. 6 and 7, the slug and housing movement is more closely seen. Thus, Fig. 6 shows that the slug travels through a distance indicated by the letter *a* during one apportioning operation, for example (the housing being shown in its original position before follow-up movement). In Fig. 7 the housing is shown as having been moved to the null-balance position by the follow-up.

It will be observed that small changes of weight (where the overall range is relatively large) will cause but minute movements of the slug, and it is a feature of the invention that such minute movements may be translated into discrete steps at the printer, counter and trip devices. Thus, sensitivity is achieved through the use of the null-balancing principle of servomechanisms as described hereinabove.

As hereinbefore pointed out, the servomechanism, including the amplification feature and the zeroing mechanism, is applicable in a wide variety of mechanisms and is by no means limited to the specific application to weighing means here shown by way of example. The specific application thereof however to the proportioning structure, as in Fig. 2, involves inventive concepts beyond those disclosed in connection with the servomechanism itself. Claims both to the servomechanism per se as well as to the weighing system are therefore incorporated in this application.

I claim:

1. A servomechanism for providing translation of the movement of an output member of a weighing scale to a motive device, comprising: a first pair of relatively movable members, one of said first pair of relatively movable members having a connection with said output member and the other of said first pair of relatively movable members having a connection to said motive device; a second pair of relatively movable members, one of said second pair of relatively movable members having a connection with said other of said first pair of movable members; and means for manually moving the other of said second pair of relatively movable members for providing a calibration correction to said servomechanism.

2. A servomechanism for providing an amplified translation of the movement of an output member to a motive device, including: a signal generating device comprising a core member and a member supporting an energizing winding and a secondary winding in surrounding relation to said core member, said core and said windings being relatively movable; means, including a shaft and fine flexible means having a zero coefficient of temperature expansion connecting one of said members to said output member; a differential transformer including a core member and a member supporting an energizing winding and a secondary winding in surrounding relation to said last named core member, said last named core and supporting members being relatively movable; means for manually moving one of the members of said transformer for providing a calibration correction to said servomechanism; and means connecting said secondary windings of said generating device and said transformer to said motive device.

3. A servomechanism for providing an amplified translation of the movement of an output member of a weighing devices to a motive device, comprising: a signal generating device including; a core member and a member supporting an energizing winding and a secondary winding in surrounding relation to said core member, said core and windings being relatively movable; fine flexible means connected to said output member and operably supporting same; a differential transformer comprising a core member and a member supporting an energizing winding and a secondary winding in surrounding relation to the last named core member, said core and windings of said transformer being relatively movable; means for manually moving said core member of said transformer for providing a calibration correction to said servomechanism; and means connecting said secondary windings of said signal generating device and said transformer to said motive device.

4. A servomechanism for providing an amplified translation of the movement of an output member of a weighing scale to a motive device, comprising: a first pair of relatively movable members, one of said first pair of relatively movable members having a flexible connection having a zero coefficient of temperature expansion with said output member and the other of said first pair of relatively movable members having a connection to said motive device; a follow-up device providing a connection between said motive device and said other of said first pair of relatively movable members, thereby establishing null-balance operation with said first pair of relatively movable members; a second pair of relatively movable members, one of said second pair of relatively movable members having a connection with said motive device; and means for manually moving the other of said second pair of relatively movable members for providing a calibration correction to said servomechanism.

5. A servomechanism for providing an amplified translation of the movement of an output member of a weighing scale to a motive device, comprising: a first pair of relatively movable members, one of said first pair of relatively movable members having a connection with said output member and the other of said first pair of relatively movable members having a fine flexible connection to said motive device; a follow-up device providing a connection between said motive device and said other of said first pair of relatively movable members, thereby establishing null-balance operation with said first pair of relatively movable members; a second pair of relatively movable members, one of said second pair of relatively movable members having a connection with said other of said first pair of movable members; and means for manually moving the other of said second pair of relatively movable members for providing a calibration correction to said servomechanism.

6. A servomechanism for providing an amplified translation of the movement of an output member of a weighing scale to a motive device, including: a signal generating device comprising a core member and a member supporting an energizing winding and a secondary winding in surrounding relation to said core member, said core and supporting members being relatively movable; flexible means having a zero coefficient of temperature expansion connecting one of said members of said generating device to said output member; a follow-up device providing a connection between said motive device and the other of said members of said generating device, thereby establishing null-balance operation in said generating device; a differential transformer comprising a core member and a member supporting an energizing winding and a secondary winding in surrounding relation to said core member, said core and supporting members of said transformer being relatively movable; means for manually moving one of said transformer members for providing a calibration correction to said servomechanism; and means connecting said secondary windings of said generating device and said transformer to said motive device.

7. A servomechanism for providing an amplified translation of the movement of an output member to a motive device, including: a signal generating device comprising a core member and a member supporting an energizing winding and a secondary winding in surrounding relation to said core member, said core and supporting members being relatively movable; means connecting said core member to said output member said means including a rotatable shaft and a fine flexible element having a portion wound on said shaft and a depending portion operably supporting said core member, said fine flexible element having a substantially zero coefficient of temperature expansion; a follow-up device providing a connection between said motive device and said supporting member, thereby establishing null-balance operation with said members of said signal generating device; a differential transformer comprising a core member and a member supporting an energizing winding and a secondary winding in surrounding relation to the last named core member, said core and supporting members of said transformer being relatively movable; means for manually moving said core member of said transformer for providing a calibration correction to said servomechanism; and means connecting said secondary windings of said signal generating device and said differential transformer to said motive device.

8. Servomechanism for translating the movement of an output means of a weighing mechanism to a motive means, including: a signal generating device embodying a pair of relatively movable electrically responsive members; a fine flexible means having a zero coefficient of expansion connecting said device with said output means operable to move one of said members relative to the other member to generate a signal responsive to movement of said output means; electrical means connected with said device and said motive means, for actuating said motive means responsive to said signal; means responsive to said actuation of said motive means for moving said other member relative to said one member to create a null-balance in said device; and power takeoff means actuated by said motive means when the latter is actuated responsive to said signal.

9. A system for providing translation of the movement of an output member, including a rotatable shaft, to a motive device, comprising: a first relatively movable member; a fine flexible element windable on said shaft and having a depending part supporting said movable member; a second relatively movable member having an operable connection with said motive device; means responsive to the relative position of said members for motivating said motive device; and means for registering the responsive movements of said motive device.

10. A system for providing translation of the movement of an output means including a rotatable shaft, comprising: a first relatively movable member; a fine flexible element windable on said shaft and having a depending part supporting said movable member; a second relatively movable member having an operable connection with said motive device; and means responsive to the relative position of said members for motivating said motive device.

11. A system for providing translation of the movement of an output means including a rotatable shaft, comprising: a first relatively movable member; a fine, flexible element windable on said shaft and having a depending part supporting said movable member, said element having a zero coefficient of temperature expansion; a second relatively movable member having an operable connection with said motive device; and means responsive to the relative position of said members for motivating said motive device.

References Cited in the file of this patent

UNITED STATES PATENTS

| | | |
|---|---|---|
| 2,293,502 | Hermann | Aug. 18, 1942 |
| 2,493,593 | Peterson | Jan. 3, 1950 |
| 2,493,605 | Warsher | Jan. 3, 1950 |
| 2,503,868 | Gaumer | Apr. 11, 1950 |
| 2,527,797 | Cohen | Oct. 31, 1950 |
| 2,546,657 | Smoot | Mar. 27, 1951 |
| 2,568,586 | Hunt et al. | Sept. 18, 1951 |
| 2,611,812 | Hornfeck | Sept. 23, 1952 |
| 2,624,539 | Hartman | Jan. 6, 1953 |
| 2,626,121 | Sachse | Jan. 20, 1953 |
| 2,657,350 | Rossire | Oct. 27, 1953 |